US009250761B2

(12) United States Patent
Vranjes et al.

(10) Patent No.: US 9,250,761 B2
(45) Date of Patent: Feb. 2, 2016

(54) AUTO-GROUPING OF APPLICATION WINDOWS

(71) Applicant: Microsoft Corporation, Redmond, WA (US)

(72) Inventors: Miron Vranjes, Seattle, WA (US); Matthew Worley, Bellevue, WA (US); Richard Fang, Redmond, WA (US); Nils Sundelin, Bothell, WA (US); Robert Jarrett, Seattle, WA (US); Jesse Satterfield, Seattle, WA (US); Alice Steinglass, Bellevue, WA (US); Chaitanya Sareen, Seattle, WA (US); Bret Anderson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 162 days.

(21) Appl. No.: 13/874,449

(22) Filed: Apr. 30, 2013

(65) Prior Publication Data

US 2014/0325431 A1    Oct. 30, 2014

(51) Int. Cl.
   *G06F 3/0481*   (2013.01)
   *G06F 9/44*     (2006.01)
   *G06F 9/54*     (2006.01)

(52) U.S. Cl.
   CPC ............ *G06F 3/0481* (2013.01); *G06F 9/4443* (2013.01); *G06F 9/542* (2013.01); *G06F 2209/545* (2013.01)

(58) Field of Classification Search
   CPC combination set(s) only.
   See application file for complete search history.

(56) References Cited

U.S. PATENT DOCUMENTS

| 3,418,459 | A | * | 12/1968 | Purdy et al. .................... 345/13 |
| 3,648,270 | A | * | 3/1972 | Metz et al. ..................... 345/24 |
| 5,371,847 | A | * | 12/1994 | Hargrove ....................... 715/788 |
| 5,412,776 | A | * | 5/1995 | Bloomfield ............ G06F 3/0481 715/783 |

(Continued)

FOREIGN PATENT DOCUMENTS

EP    0689134 A1    12/1995

OTHER PUBLICATIONS

International Search Report, Application No. PCT/US2013/060755, filed Sep. 20, 2013, mailed Feb. 7, 2014.

(Continued)

*Primary Examiner* — Phenuel Salomon
(74) *Attorney, Agent, or Firm* — Jim Banowsky; Judy Yee; Micky Minhas

(57) ABSTRACT

Described herein are techniques for automatically forming groups of application windows. The techniques may be performed with a computing device executing a windowing system, the windowing system having a user interface element that can be interacted with by a user to manage applications executing on the computing device. Each application may correspond to a separate process and application window. It may be determined that an operation has occurred that will evict the application windows of target applications from the display, and in response an application group may be automatically formed. The application group may have indicia of the evicted target applications. The application group may be provided to the user interface element, and when the user interface element is interacted with by the user the user interface element displays user-selectable graphic application indicators for both the application group and applications other than the target applications.

19 Claims, 8 Drawing Sheets

(56) References Cited

U.S. PATENT DOCUMENTS

| | | | | |
|---|---|---|---|---|
| 5,487,143 | A * | 1/1996 | Southgate | 715/790 |
| 5,491,795 | A * | 2/1996 | Beaudet | G06F 3/0481 715/804 |
| 5,499,334 | A * | 3/1996 | Staab | G06F 9/44505 715/778 |
| 5,572,649 | A * | 11/1996 | Elliott | G06F 3/0481 345/501 |
| 5,613,057 | A * | 3/1997 | Caravel | G06F 17/30017 345/620 |
| 5,694,561 | A * | 12/1997 | Malamud | G06F 3/0481 715/805 |
| 5,771,042 | A * | 6/1998 | Santos-Gomez | 715/800 |
| 5,801,699 | A | 9/1998 | Hocker et al. | |
| 6,208,344 | B1 | 3/2001 | Holzman et al. | |
| 6,388,685 | B1 * | 5/2002 | Minoura et al. | 715/788 |
| 6,970,749 | B1 * | 11/2005 | Chinn et al. | 700/12 |
| 7,027,035 | B2 * | 4/2006 | Youden | 345/169 |
| 7,581,192 | B2 | 8/2009 | Stabb et al. | |
| 7,847,786 | B2 * | 12/2010 | Schobben et al. | 345/156 |
| 8,587,546 | B1 * | 11/2013 | El-Khoury | 345/173 |
| 8,612,883 | B2 * | 12/2013 | Louch et al. | 715/797 |
| 8,933,874 | B2 * | 1/2015 | Lundqvist et al. | 345/108 |
| 2001/0035882 | A1 | 11/2001 | Stoakley et al. | |
| 2004/0066414 | A1 | 4/2004 | Czerwinski et al. | |
| 2005/0198584 | A1 | 9/2005 | Matthews et al. | |
| 2005/0223334 | A1 * | 10/2005 | Guido et al. | 715/794 |
| 2006/0248404 | A1 * | 11/2006 | Lindsay et al. | 714/38 |
| 2007/0192733 | A1 * | 8/2007 | Horiuchi | 715/788 |
| 2008/0034317 | A1 * | 2/2008 | Fard et al. | 715/781 |
| 2009/0094554 | A1 | 4/2009 | Karstens | |
| 2010/0095248 | A1 | 4/2010 | Karstens | |
| 2010/0313164 | A1 * | 12/2010 | Louch et al. | 715/790 |
| 2012/0162266 | A1 | 6/2012 | Douglas et al. | |
| 2013/0067412 | A1 | 3/2013 | Leonard et al. | |

OTHER PUBLICATIONS

Xue, Zhiming., "Windows 8 How to: 10. Customize Metro UI—App Tiles and Groups", Retrieved at <<http://blogs.msdn.com/b/zxue/archive/2012/03/07/win8-howto-10-customize-metro-ui-app-tiles-and-groups.aspx>>, Mar. 7, 2012, pp. 3.

Kaufman, Lori., "Organize Tiles into Groups on the Metro Start Screen in Windows 8", Retrieved at <<http://www.howtogeek.com/122446/organize-tiles-into-groups-on-the-metro-start-screen-in-windows-8/>>, Aug. 23, 2012, pp. 4.

"Group Tiles Adds Group Labels to Your Start Screen", Retrieved at http://wmpoweruser.com/group-tiles-adds-group-labels-to-your-start-screen/, Mar. 25, 2013, pp. 4.

"Create an App Group", Retrieved at <<http://mcfedries.com/Windows8VQT/sample.pdf/>>, Retrieved date: Apr. 16, 2013, pp. 2.

Digs, Matthew., "How to Refresh the Thumbnails on Google Chrome's New Tab Page", Retrieved at <<http://www.howtogeek.com/howto/34690/refresh-most-visited-page-icons-in-google-chrome/>>, Nov. 8, 2010, pp. 3.

"How to Use Mac Os X Lion Spaces", Retrieved at <<http://www.wikihow.com/Use-Mac-Os-X-Lion-Spaces/>>, Mar. 1, 2012, pp. 5.

\* cited by examiner

AUTO-GROUPING OF APPLICATION WINDOWS

BACKGROUND

Windowing systems are well known in the art of computing. Windowing systems often provide facilities for a user to interactively manage applications (programs) with windows displayable on a display. Basic functions such as opening, closing, minimizing, maximizing, resizing, switching, and arranging applications are commonly found in some windowing systems. Some windowing systems may allow multiple windows for respective applications to be concurrently displayed on a display.

A problem recognized only by the inventors is that there are times when, due to system or user activity, a user's arrangement or layout of application windows on a display may be lost or overridden. A user's time and effort spent arranging windows may be lost when those windows are later evicted from the display. In addition, there may be times when a user would benefit from being able to manipulate a group of windows as a logical set, possibly in response to an implicit action such as launching an application.

Techniques related to grouping application windows are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Described herein are techniques for automatically forming groups of application windows. The techniques may be performed with a computing device executing a windowing system, the windowing system having a user interface element that can be interacted with by a user to manage applications executing on the computing device. Each application may correspond to a separate process and application window. It may be determined that an operation has occurred that will evict or occlude the application windows of target applications from the display, and in response an application group may be automatically formed. The application group may have indicia of the evicted target applications. The application group may be provided to the user interface element, and when the user interface element is interacted with by the user the user interface element displays user-selectable graphic application indicators for both the application group and applications other than the target applications.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to forming groups of application windows and allowing the user to interact with the groups in ways that the application windows themselves might be interacted with. Discussion will start with an overview of windowing systems. Layout and operations in a tiled windowing system are discussed next, followed by description of how and when an application group may be formed. Integration of application groups into the windowing system is then covered, along with explanation of how a user can interact with application groups and application windows in similar manners.

Figure 1:
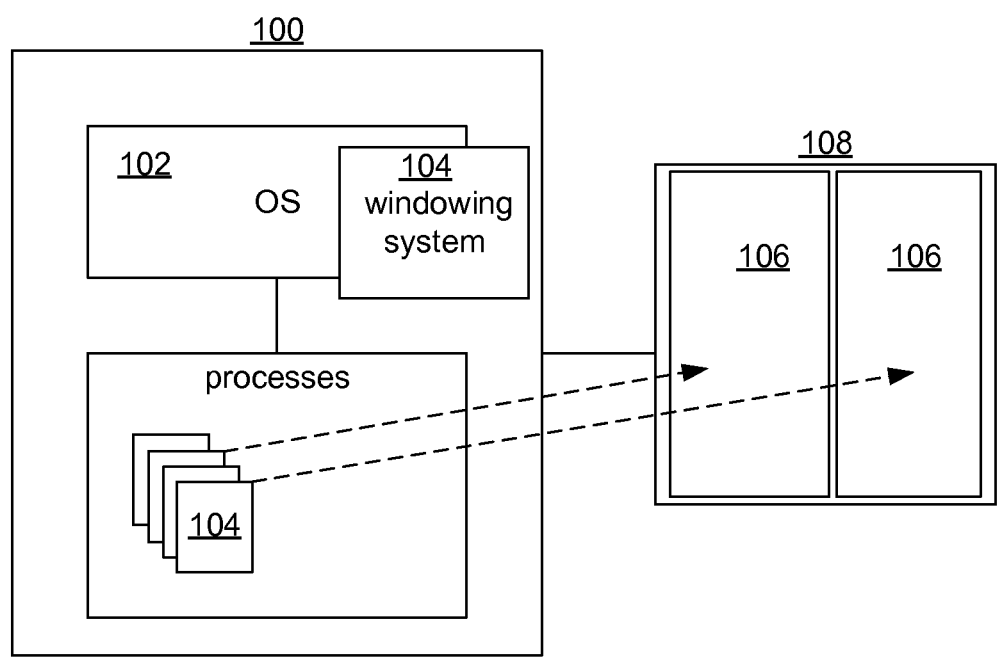
FIG. 1 shows a computing device having an operating system managing application processes and displaying corresponding windows on a display.
Figure 2:
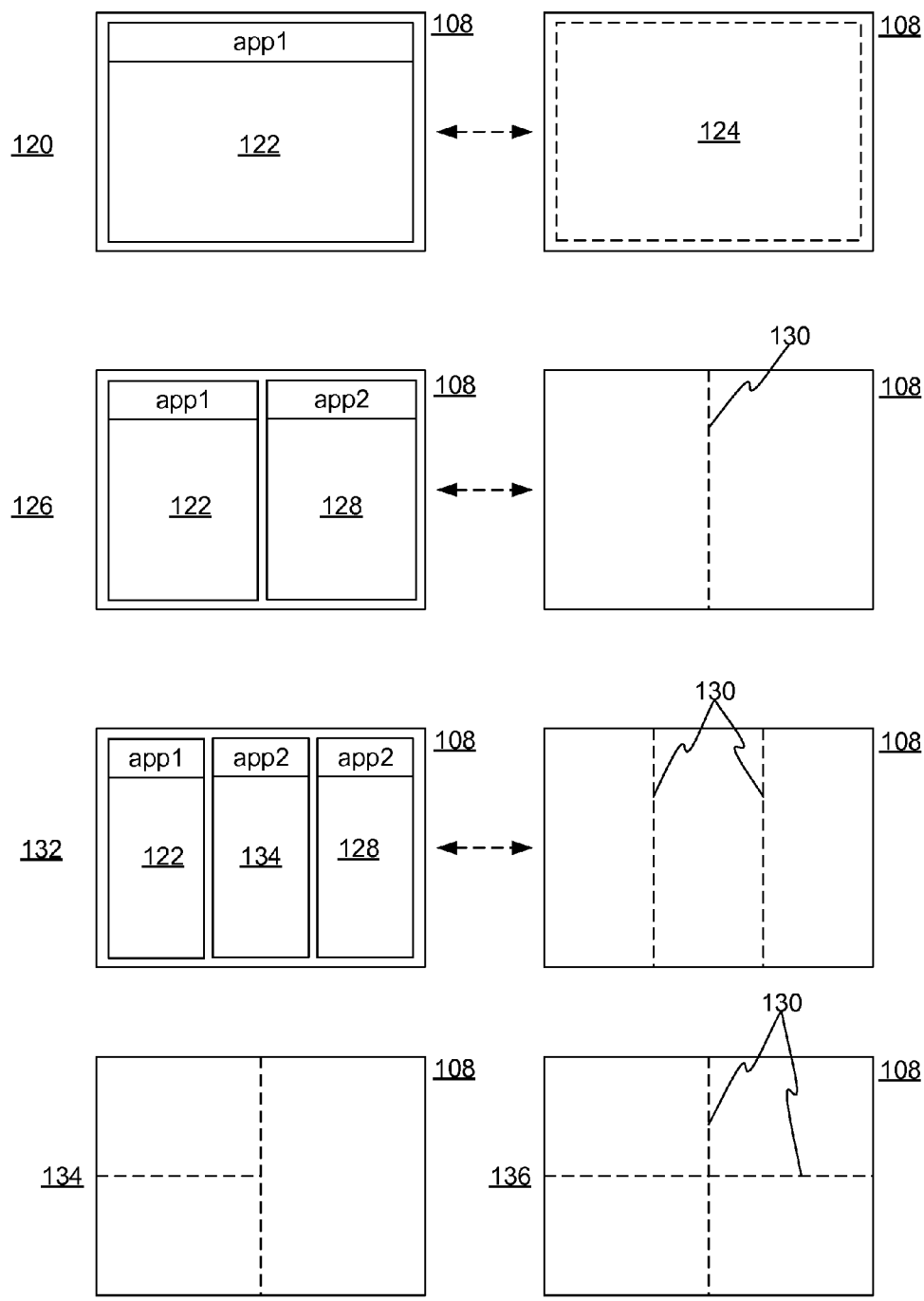
FIG. 2 shows example window layouts provided by a tiled windowing system.

FIG. 1 shows a computing device 100 having an operating system 102 managing application processes 104 and displaying corresponding windows 106 on a display 108. The computing device 100 may be any of a variety of types which are described later with reference to FIG. 8. The computing device 100 may be assumed to have at least storage and a processor for executing the operating system 102 and the application processes 104. Although there may be windowing systems with individual windows that represent multiple processes, and also processes without windows, for ease of discussion application processes 104 are assumed herein to each have at least a corresponding window 108. Processes are well known operating system objects that are discretely managed units of execution, typically having a process identifier, memory managed by the operating system (heap and/or stack memory), and may be managed in a process table of process identifiers or the like that is maintained by the operating system FIG. 2 shows example window layouts provided by a tiled windowing system. The first example layout 120 shows a first application window 122 substantially occupying the display 108 or a managed display region 124 managed by the windowing system. The second example layout 126 reflects the addition of a second application window 128. The tiled windowing system automatically manages the window layout to cause the currently displayed application windows 122, 128 to somewhat maximize occupancy of the display 108, with some display real estate possibly used for non-window graphics such as aesthetic margins, non-application user interface elements such as search bars or application selection lists, dividers for resizing application windows, etc. The tiled window manager may insert a divider 130 that can be moved by a user to resize the application windows adjacent to the divider 130.

In one embodiment, the tiled windowing system manages the layout of windows in a way that prevents application windows from occluding other application windows, possibly with exceptions such as previewing manual window rearrangements, dragging windows, and other transient conditions.

The third example layout 132 shows a third application 134 having been inserted. With tiled layout management, a user may only need to designate the third application window 134 to be inserted and/or possibly designate a slot or location for inserting the third application window 134; the tiled window manager may automatically resize the displayed application windows or take other measures to accommodate the new application window. The fourth and fifth example layouts 136, 138 show other divisions of screen real estate that may be used. For ease of discussion, examples discussed below show tiling using only a single horizontal row of application windows.

Figure 3:
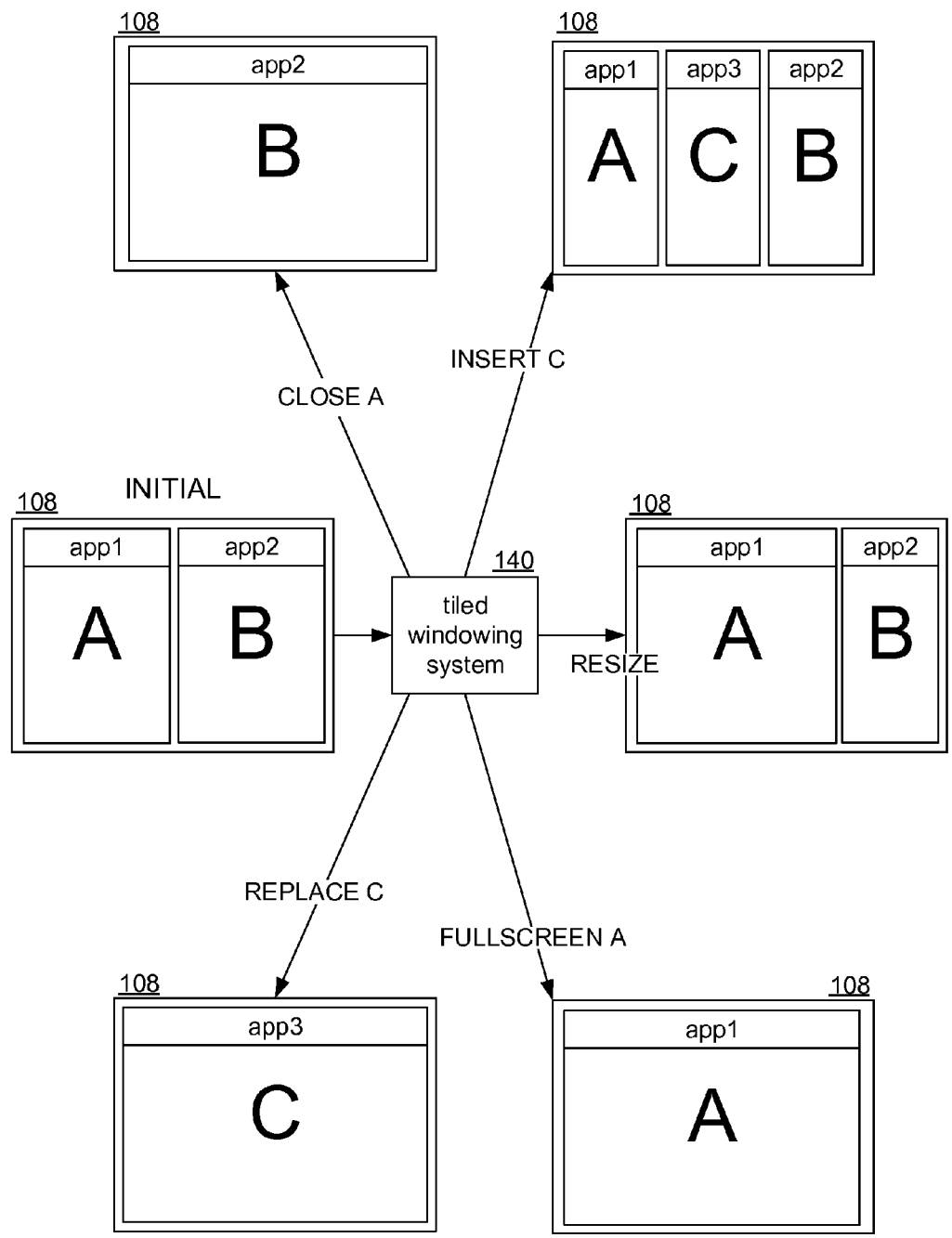
FIG. 3 shows window operations that may be performed, either manually or as a result of system events.

FIG. 3 shows window operations that may be performed, either manually or as a result of system events. Given an initial window arrangement on the display 108, a tiled windowing system 140 may close application A resulting in application B being automatically resized to occupy the display 108. An application might be closed manually or may be closed due a system event such as an error. When application C is inserted into the initial layout applications A and B are automatically resized by the tiled windowing system 140 to accommodate the newly displayed application window of application C. A resize operation may be performed, for example by user manipulation of a divider 130, to change the apportionment of display space for the application windows. If a currently displayed application or another application enters a fullscreen mode then the other application windows are evicted from the display 108. The user may select an application (e.g., application C) to replace any other applications displayed.

As can be seen, a variety of user-originated or system-originated actions can trigger the removal of application windows from the display 108. For example, a dormant off-screen application might receive a wakeup signal and automatically enter a fullscreen mode (in turn displacing application windows), or a two-display system might lose a display, which the windowing system might interpret as an event that should close the windows on the lost display. Or, an application might launch another application and the launched application might occupy the display.

Applications may be handled in different ways when they are evicted from the display 108. In some implementations, applications that are evicted from the display 108 are suspended. In other implementations applications may respond in customized ways to being displaced. For example, one application may respond to an "inactive" signal by terminating, whereas another application may respond by continuing to execute in the background. As will be described further below, the windowing system may provide user interface elements to allow a user to quickly reactivate hidden or dormant applications, open favorite or recent applications, toggle between different applications, and so forth. These same features of the windowing system may also handle application groupings, or application group objects, which may be formed by an explicit user instruction or implicitly by user or system actions that cause application windows to be evicted from the display, for example.

Figure 4:
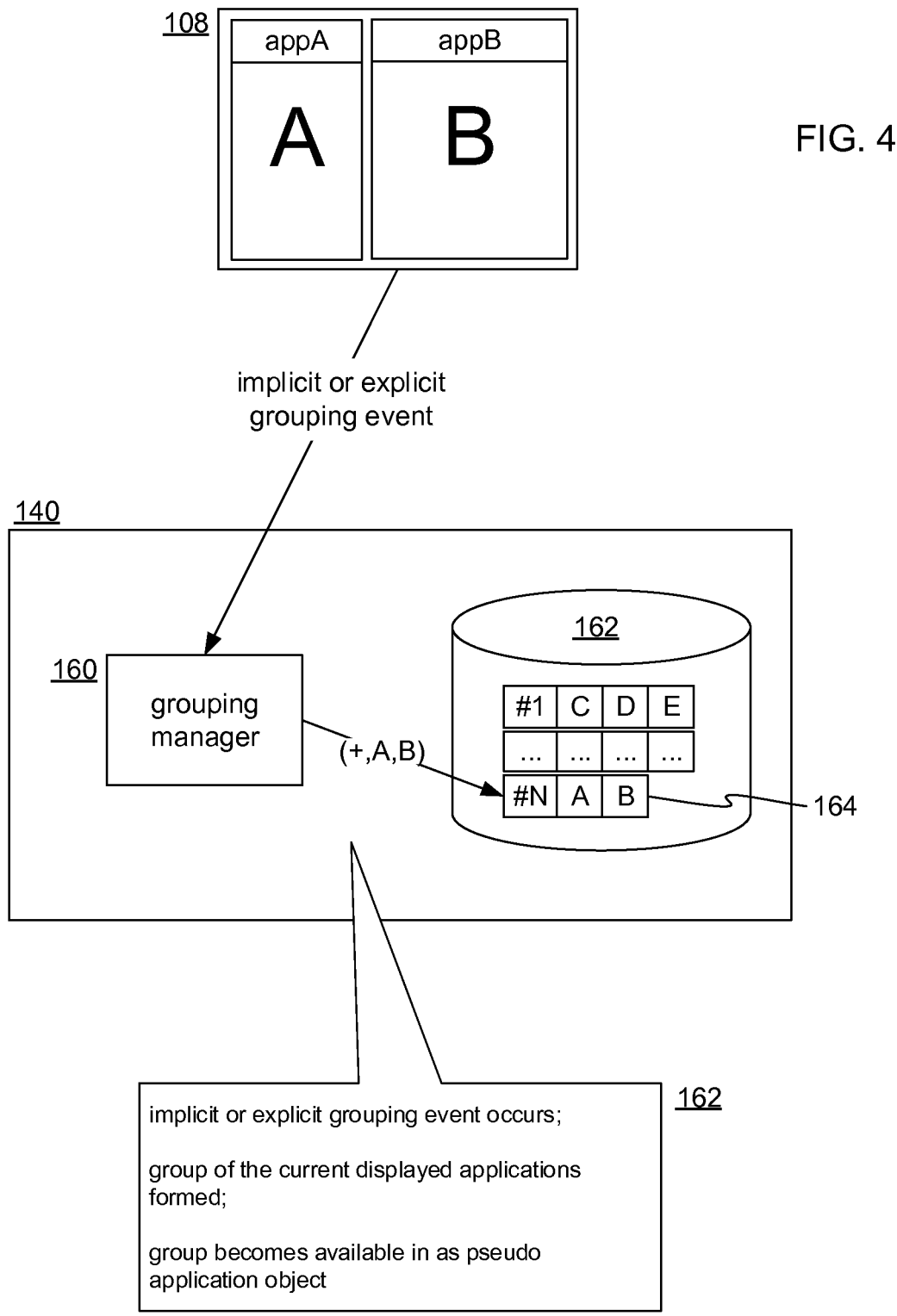
FIG. 4 shows details of a tiled windowing system for facilitating automatic grouping of application windows.

FIG. 4 shows details of the tiled windowing system 140 for facilitating automatic grouping of application windows. Initially application windows are displayed on the display 108. In the example of FIG. 4, applications A and B are displayed. The tiled windowing system 140 performs a process 162 involving first receiving a notice or signal that a grouping event has occurred. Indicia of the currently displayed applications is formed and stored in a group store 162. The application group object 164 then becomes available as a windowing object.

The information in or associated with an application group object 164 may vary according to implementation specifics. It may be possible to have minimal information such as a list of the applications in the group and the order they appear on the screen (or, for example, a layout template and indicia of which regions thereof have which application windows). If the applications provide information about their size, such information might be sufficient to enable re-creation of the initial window layout that corresponds to the application group object 164. In other implementations, the application group object 164 might include information such as application states, window sizes and locations, and so forth. Such layout information might also include z-order information or information that binds the group of windows together in their arrangement.

The grouping manager 160 might capture an image of the display 108 when the grouping event occurs. This image may be used as a thumbnail that is displayed when the windowing system needs to graphically represent the application group object. If the applications in the group continue to execute in the background when they are undisplayed then a live thumbnail may be generated from the applications in the group.

Note that in the example of FIG. 4 the group store 162 has a row for each application group object. Each row may have an identifier (e.g., "#1") and indicia of its member, including at least information identifying which applications or application windows are in the group. In the example of FIG. 4, group "#N" is formed responsive to the grouping event received while applications A and B are displayed.

Regarding the grouping event, such an event may originate from system activities or from user activity. A number of approaches may be used to detect or signal grouping events. The windowing system may have a laundry list of high level user interactions or commands that are to trigger a grouping event. Such a list might include "fullscreen" or "maximize" commands, a logoff command, switching a multi-monitor mode from an extended mode (e.g., two monitors treated as a single virtual display) to a duplicate mode (two monitors mirroring the same graphic content), closing all windows, interactively placing a new application window in a way that displaces the currently displayed applications, and so forth. In addition, events that do not relate to displacement of windows may also trigger group captures. The windowing system may have an application programming interface (API) that is used by applications, and certain calls or methods of that API might be designed to have side effects of triggering grouping events. Other techniques for implicitly triggering grouping events may be used, such as providing a layout manager of the windowing system with logic to detect certain types of layout changes or conditions that might correspond to a group of applications being simultaneously removed from the display.

In sum, application group objects are containers that may be implicitly created to capture a screen view, and in particular application windows and their layout, before the screen view is altered, lost, displayed, etc. The application group object may have information that allows the screen view to be substantially reproduced when requested. In addition, as described next, the application group object may in some ways be treated by the windowing system as an ordinary window object subject to ad hoc manipulation by a user in some same ways that windows are interactively manipulated.

Figure 5:
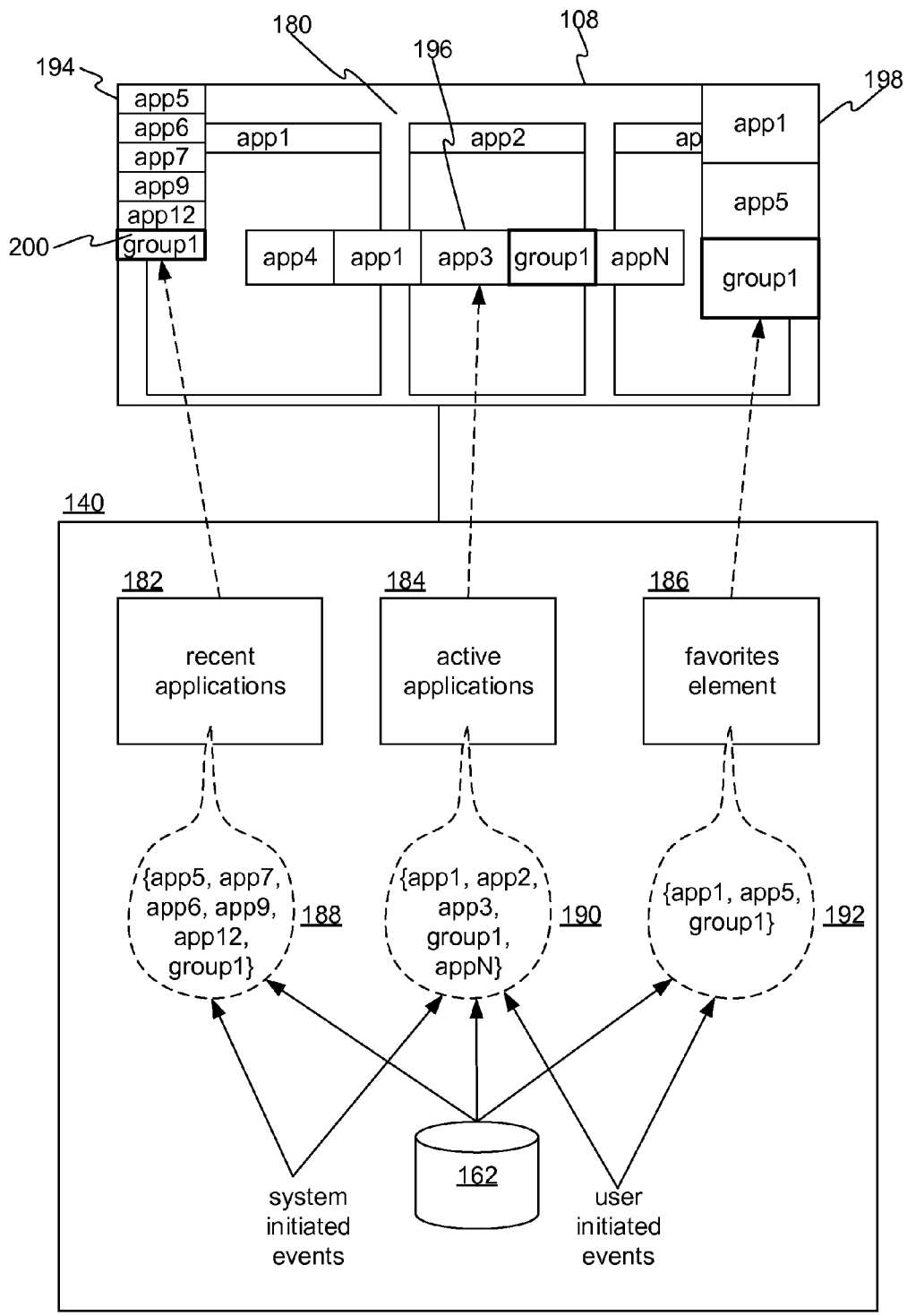
FIG. 5 shows a graphical user interface provided by or implemented on top of the tiled windowing system.

FIG. 5 shows a graphical user interface 180 provided by or implemented on top of the tiled windowing system 140. The elements or features of the graphical user interface 180 are only examples and other types of features are contemplated and equally applicable to application windows and application groups (for example, a search feature might return both applications and application group objects).

The tiled windowing system 140 may have various features or facilities that allow a user to manage applications on the computing device. Such features might include a recent applications module 182, an active applications module 184, and/ or a favorites module 186. These modules cooperate with the windowing system to track the semantically relevant information. When applications are opened or used the windowing system might populate a recent-applications list 188 with indicia of recently used applications. The windowing system might similarly populate or provide an active-applications list 190, which might include applications currently displayed on any connected monitors and/or applications that are executing or suspended but are not currently displayed. Similarly, a user might maintain a favorite-applications list 192. These lists are used by the graphical user interface 180 to display corresponding user interface elements 194, 196, 198, that can be activated and used by the user to activate applications or application groups, as the case may be.

The graphical user interface 180 may be designed to handle group application objects in same ways that applications are handled. The group application objects in the group store 162 may be added to any of the application lists 188, 190, 192 and may be manipulated in the corresponding user interface elements 194, 196, 198. For example, if the user selects the "app5" icon in user interface element 194 the corresponding application might be opened and a process of interactive placement of the application might begin. On the other hand, if the application group icon 200 is selected by the user then the corresponding application group object may be accessed and used to display the application windows of the applications in the group, preferably recreating the layout of those applications when the group was formed. Note that this action might itself act as a grouping event that triggers formation of a new application group object for any applications displaced by the application windows of the selected group.

The ways in which an application group object may "stand in the place of" an application window are nearly limitless, although some such functional equivalencies may be more useful than others. User controlled windowing operations that affect application window layouts or that determine which applications are displayed/undisplayed or active/inactivated may particularly benefit from being designed to accommodate application group objects as well as applications themselves.

Figure 6:
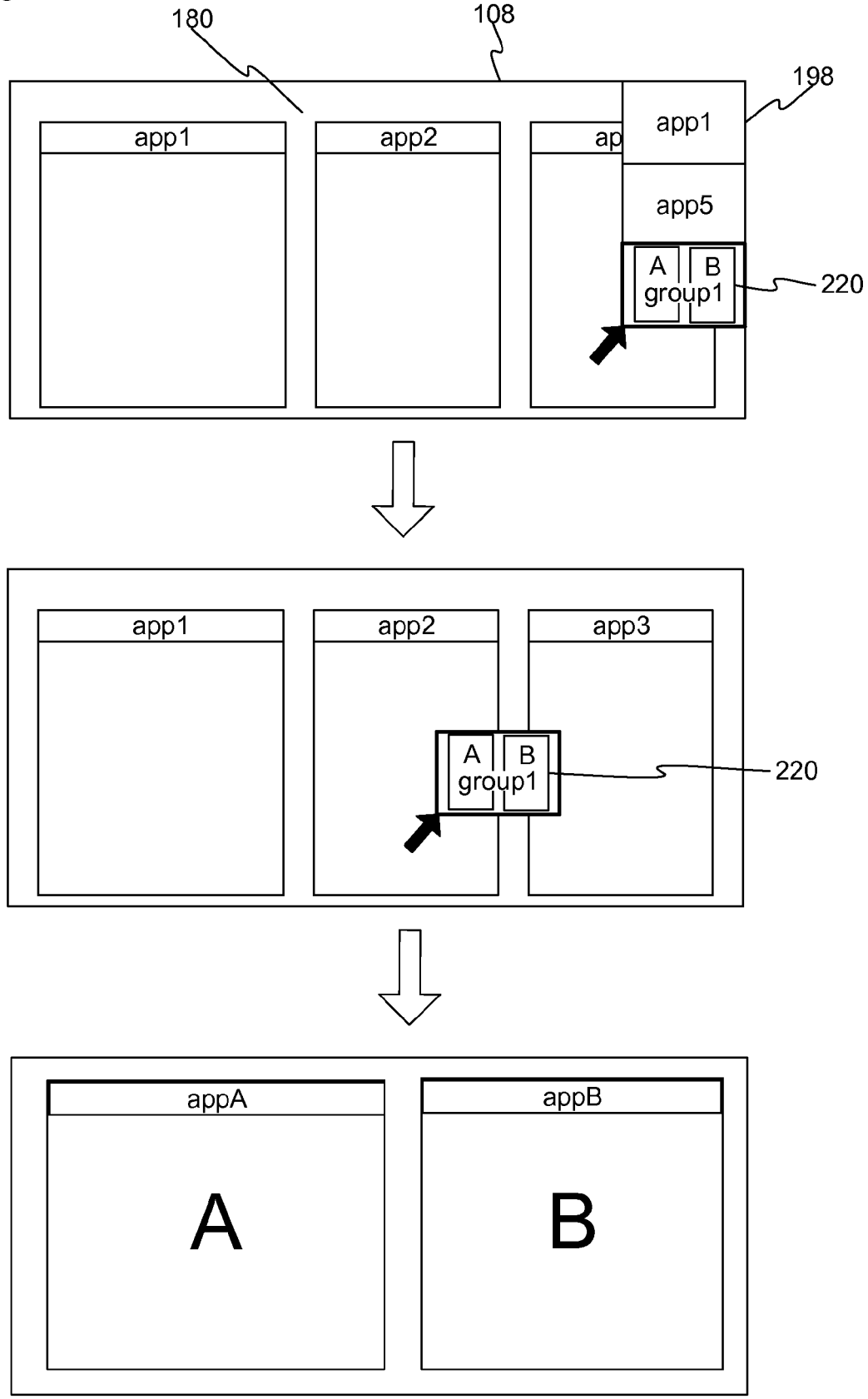
FIG. 6 shows another use of an application group.

FIG. 6 shows another use of an application group. The user interface element 198, which includes a graphic representation 220 of a corresponding application group (having applications A and B) may be displayed responsive to a user gesture, actuation of a hint, button, or the like. The graphic representation 220 may be interactively dragged from the user interface element 198 by the user, as shown in the middle part of FIG. 6. When released or dropped the application group is activated or opened. In turn, the application group object is accessed to obtain the information needed to recreate the layout of the application windows in the application group. In this example, applications A and B are opened and displayed (lower part of FIG. 6) in a layout that corresponds to their layout when the application group was formed. Various visual effects may be used. A rendering of the prior or emerging layout may be animated as enlarging to occupy the display before switching to live activation of the windows.

In one embodiment, the graphic representation 220 (whether a thumbnail or a generic symbol) may itself serve as a new user interface element that can be provided with features such as menus, selectable application icons, or inquiries that allow applications to be individually selected and activated from the group (which may or may not remove the selected application from the group). Similarly a group might be dissolved, might have its applications added to the favorites-list 192, and so on.

Figure 7:
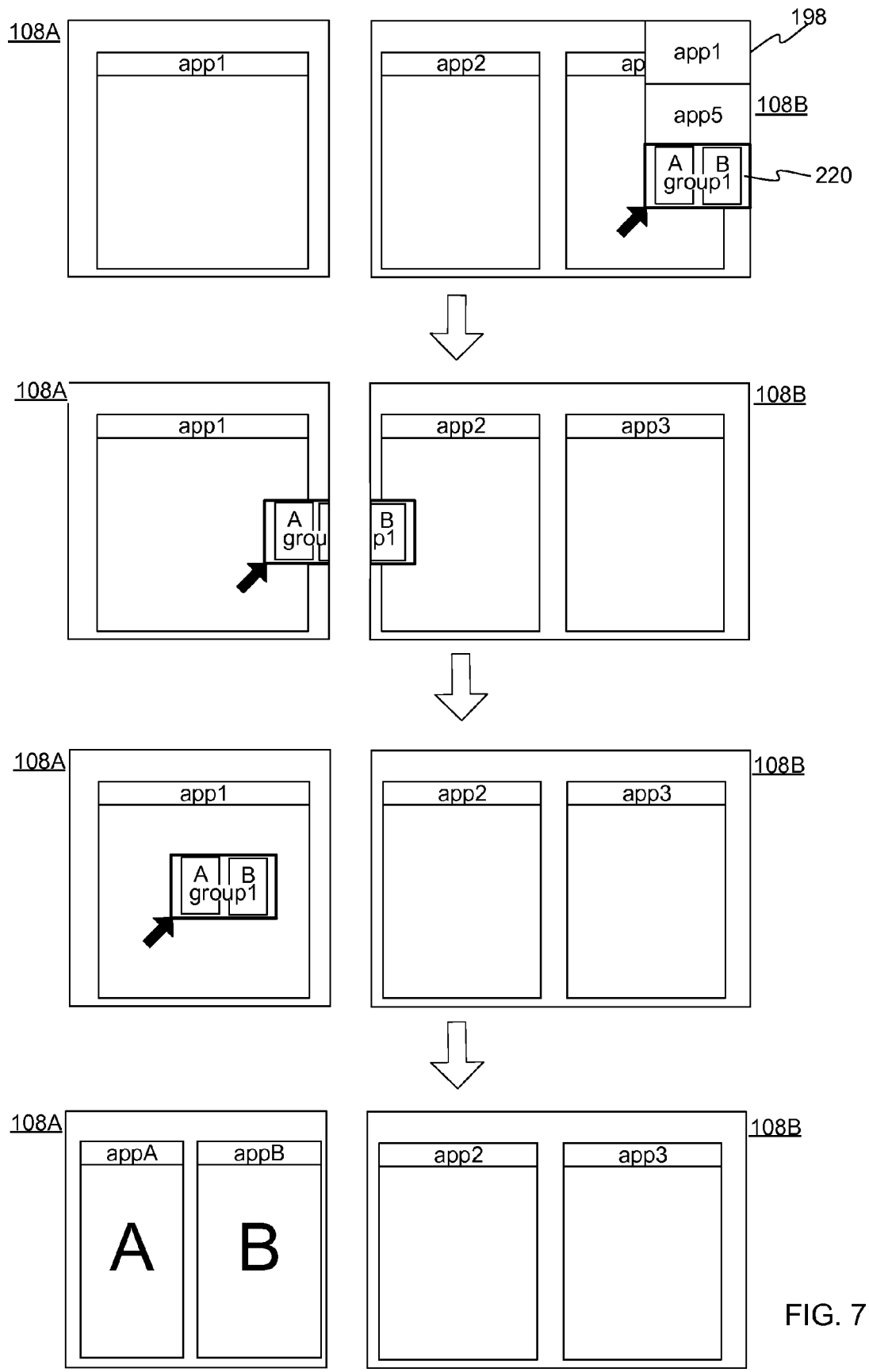
FIG. 7 shows a multi-display embodiment.

FIG. 7 shows a multi-display embodiment. As mentioned above, some windowing/operating systems are able to manage multiple monitors. In this case, the graphic representation 220 may be moved between a first display 108A and a second display 1088. The graphic representation 220 can be used to select a target one of the displays 108A, 108B, for example, by dropping the graphic representation 220 on one of the displays 108A, 108B. In the example of FIG. 7 the graphic representation 220 of the application group is dropped on the first display 108A, causing the windowing system to reference the application group object, identify the corresponding applications (A and B) and ascertain or compute their layout, and display the application windows accordingly on display 108A. If the displays 108A, 108B have different sizes, different strategies may be used to approximate the prior layout of a group, such as proportional preservation, dropping last-added or inactive applications, etc. Such strategies may be used if a group is captured from a first display and then opened later on a different display or on the same display but with different display dimension settings.

While embodiments discussed above may be implemented with and helpful for a tiled windowing system, the embodiments may be as readily implemented on non-tiling or occlusion-permitting windowing systems.

As noted, a user may also explicitly trigger a group to be formed, for instance using a specific command. In this case, the applications and layout might remain after the group is formed and stored. In other words, group formation need not be linked to eviction of application windows from a display.

In addition, while application groups have been described as useful for "reopening" a prior application window arrangement, application groups, as sets of applications, may be used in other ways as well. For example, dragging a group onto a "favorites" tool might add the member applications to the favorites. A gesture or some type of drop target (e.g., a trashcan) might be provided to terminate the processes of the member applications and to dissolve the group. Gestures for managing execution state of an application might be applied to groups to manage as a single unit the execution state of the member applications. The implicit formation of application groups in ways described above is useful regardless of how those groups are ultimately used and in fact group formation has high utility because of the many practical uses of application groupings.

Application groups may be integrated with various functions of a windowing system. For example, any manipulation of an application window, such as closing/hiding, moving, resizing, replacing, full-screening, and others may be applied to application groups.

Further regarding restoring applications in a group, in one embodiment a graphic representation of an application group can be interacted with to selectively pull out applications or divide the group. Suppose a group is created having three applications and the group is in an application switching list. The group may be selected and shown onscreen, and at that time the user may pick which of the member applications are to actually be inserted on the display; any unselected applications can remain in the group which remains in the switching list, perhaps as a new subgroup of the remaining applications.

Inclusion of the same application in different groups may be handled in different ways. Cross-group inclusion may be simply prohibited. In one embodiment, an application might retain state information for each group that it is a member of.

As discussed above, windowing systems, whether tiled or not, may at times replace or remove application windows that are currently being displayed. To avoid possible loss of a user's time spent selecting and arranging application windows, indicia of the content of a display (or a managed area thereof) may be captured and stored as an application group object. The application group object may then be used in the windowing system in places where applications or their windows are used.

Figure 8:
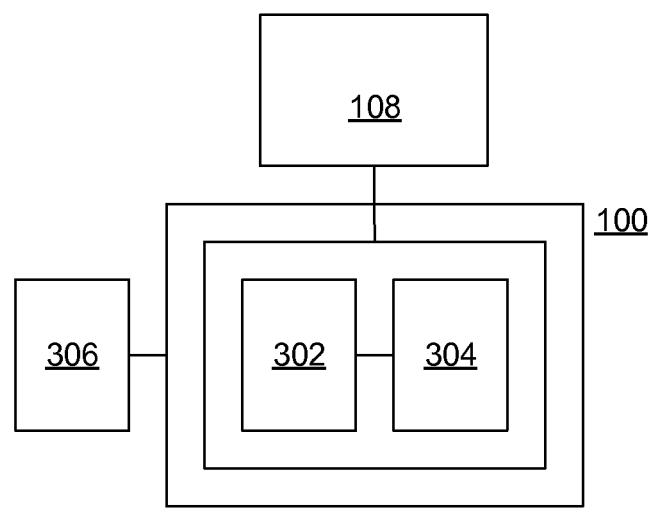
FIG. 8 shows an example of the computing device on which embodiments described above may be implemented.

FIG. 8 shows an example of the computing device 100 on which embodiments described above may be implemented. The computing device 100 may have the display 108 (or multiple displays such as the dual displays 108A, 108B discussed above), as well as storage 302 and a processor 304. These elements may cooperate in ways well understood in the art of computing. In addition, input devices 306 may be integrated with or in communication with the computing device 300. The display 108 may be a touch-sensitive display that also functions as an input device. The computing device 100 may have any form factor or be used in any type of encompassing device. For example, touch-sensitive control panels are often used to control appliances, robots, and other machines. The computing device 100 may be in the form of a handheld device such as a smartphone, a tablet computer, a gaming device, a server, or others.

Embodiments and features discussed above can be realized in the form of information stored in volatile or non-volatile computer or device readable devices. This is deemed to include at least devices such as optical storage (e.g., compact-disk read-only memory (CD-ROM)), magnetic media, flash read-only memory (ROM), or devices for storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile devices storing information that allows a program or executable to be loaded and executed. The embodiments and features can be performed on any type of computing device, including portable devices, workstations, servers, mobile wireless devices, and so on.

The invention claimed is:

1. A method of automatically capturing groups of application windows, the method performed on a computing device comprising a display, an input device, a processor, and storage, the storage and processor storing and executing a windowing system, the windowing system managing a user interface element that is interacted with by a user to manage applications executing on the computing device, the method comprising:
   executing the applications, each application comprising a respective application window, the application windows, when displayed, are receptive to user input that controls the respective applications;
   determining that an operation has occurred, and in response automatically determining which application windows are displayed on the display and determining a display arrangement of the displayed application windows, and forming and storing an application group comprising indicia of the determined application windows and indicia of the display arrangement thereof; and
   providing the application group to the user interface element, wherein when the user interface element is invoked by the user the user interface element displays user-selectable graphic application indicators, wherein a first graphic application indicator represents the application group and other graphic application indicators represent respective applications other than the target applications, wherein when the first graphic application indicator is activated by the user the application group is used to automatically display the application windows indicated by the application group in the arrangement as indicated by the application group, and wherein when any of the other graphic application indicators are activated by the user the corresponding application windows are automatically displayed.

2. A method according to claim 1, wherein the windowing system comprises a tiled window layout manager that automatically maintains a tiled arrangement for the application windows as application windows are opened and closed by the user, and wherein the operation comprises an application window replacing the application windows on the display.

3. A method according to claim 1, wherein when the user selects a graphic application indicator that represents a single application then an application window for that single application is activated, and when the user selects the first graphic application indicator that represents the application group then the application windows corresponding to the application group are displayed on the display.

4. A method according to claim 3, wherein the operation causes either an application window to substantially fully occupy the display, or the operation causes the target application windows to be not displayed on the display.

5. A method according to claim 1, further comprising receiving user input selecting the application group while the user interface element is not being displayed, and in response, based on the application group, displaying on the display the application windows of the applications in the application group.

6. A method according to claim 5, wherein the application group comprises layout information and the layout information is used by the windowing system, when displaying the application windows of the applications in the application group, to reproduce a layout that the application windows in the application group had before the operation.

7. A method according to claim 1, wherein the windowing system manages the application group as an application object such that interactive features of the windowing system that allow the user to interact with or manage applications also allow the user to interact with or manage the application group as if it were a single application.

8. A method according to claim 1, wherein the first graphic application indicator of the application group comprises an image of the application windows in the application group.

9. A computing device comprising a processor, storage, a display, and an input device, the computing device further comprising:
   a first, second, and third application executing by the processor, each application comprising a respective different process provided by an operating system of the computing device, each application further comprising a respective application window displayable by the display in a display region, each application window, when displayed in the display region, comprises an interactive graphic object that is receptive to user input that controls the corresponding process;
   a user interface executing by the processor that allows a user of the computing device to open and close application windows in the display region;
   the display displaying the application windows of the first and second applications, respectively, in the display region;

the processor, when the application windows of the first and second applications are respectively displayed on the display, receiving an event that causes the application window of the third application to displace from the display the application windows of the first and second applications such that the application windows of the first and second applications are no longer displayed on the display; and responsive to the event, the processor automatically determining which application windows are displaced from the display by the event to identify the application windows of the first and second applications, and based thereon configuring an application group object to comprise indicia of the first application and the second application, wherein the user interface allows the user to select the application group object and to select individual applications, wherein when the application group object is selected whichever windows are indicated by the application group object are automatically displayed in the display region, and wherein when an individual application is selected a corresponding application window is displayed in the display region.

10. A computing device according to claim 9, wherein an application management operation comprises an open operation that displays individual applications when directed to the individual applications and that opens all of the applications in a group of applications when directed to a group application object.

11. A computing device according to claim 10, wherein the graphical user interface receives an input from the input device directing the open operation to the application group object and in response the graphical user interface, according to the indicia of the first and second applications of the group application object, displaces one or more application windows on the display with the application windows of the first and second applications.

12. A computing device according to claim 9, further comprising a second display, wherein the graphical user interface allows a graphic representing the application group object to be interactively dragged to the display and the second display, and the graphical user interface responds to a drop of the graphic onto either of the displays by automatically displaying the application windows of the first and second applications on whichever of the displays the graphic is dropped to.

13. A computing device according to claim 9, wherein the graphical user interface comprises an interactive application switching element that allows a user to select applications to display on the display, wherein when the user uses the application switching element to select the application group object the processor identifies the first application and the second application from the application group object and displays the application windows of the first and second applications, respectively.

14. A computing device according to claim 13, wherein the graphical user interface allows the user to select from among the applications represented by the application group object to display a selected one of the applications.

15. A computing device comprising:
processing hardware;
storage hardware storing instructions that, when executed by the processing hardware, implement a graphical user interface comprising a display area that displays application windows according to user inputs, wherein the graphical user interface closes application windows according to user inputs and arranges layouts of application windows in the display area;
the graphical user interface responds to an event that causes whichever application windows are being displayed in the display area to be not displayed in the display area, wherein the graphical user interface responds by identifying which application windows are caused to be not displayed from the display area by the event, and based thereon configures an application group object to comprise indicia of the identified application windows or applications corresponding thereto; and
wherein the graphical user interface allows the user to select the application group object and to select individual applications, wherein when the application group object is selected whichever windows are indicated by the application group object are automatically displayed in the display area, and wherein when an individual application is selected a corresponding application window is displayed in the display area.

16. A computing device according to claim 15, wherein the event corresponds to newly displaying a graphic in the display area, the display becoming unavailable, an error, a logoff event, or a windowing command initiated by a user input.

17. A computing device according to claim 15, wherein the graphical user interface
allows user input to move a graphic representation of the application group object between the display and a second display, wherein whichever display the graphic representation is targeted to by the user input will display the applications indicated by the application group.

18. A computing device according to claim 15, wherein the graphical user interface comprises a windowing system.

19. A computing device according to claim 18, wherein the windowing system comprises a tiled windowing system.

* * * * *